United States Patent
Sonoda et al.

(10) Patent No.: US 7,056,089 B2
(45) Date of Patent: Jun. 6, 2006

(54) HIGH-TURNING AND HIGH-TRANSONIC BLADE

(75) Inventors: Toyotaka Sonoda, Wako (JP); Toshiyuki Arima, Wako (JP); Koji Murata, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 114 days.

(21) Appl. No.: 10/803,554

(22) Filed: Mar. 18, 2004

(65) Prior Publication Data
US 2004/0228732 A1   Nov. 18, 2004

(30) Foreign Application Priority Data
Mar. 25, 2003   (JP)   ............................. 2003-083411

(51) Int. Cl.
*F01D 21/00*   (2006.01)
(52) U.S. Cl. .................. 415/181; 416/243; 416/DIG. 2
(58) Field of Classification Search ................ 415/181; 416/243, 223 A, 225, DIG. 2
See application file for complete search history.

(56) References Cited

U.S. PATENT DOCUMENTS

| | | |
|---|---|---|
| 4,655,412 A | 4/1987 | Hinkleman |
| 5,554,000 A * | 9/1996 | Katoh et al. ............. 415/208.2 |

FOREIGN PATENT DOCUMENTS

| | | |
|---|---|---|
| JP | 07-083196 | 3/1995 |
| JP | 09-256998 | 9/1997 |

* cited by examiner

*Primary Examiner*—Edward K. Look
*Assistant Examiner*—Dwayne J White
(74) *Attorney, Agent, or Firm*—Carrier, Blackman & Associates, P.C.; Joseph P. Carrier; William D. Blackman (57) ABSTRACT

A high-turning and high-transonic blade for use in a blade cascade of an axial-flow compressor, wherein a distribution of flow speed on an extrados at a leading edge of the blade has a supersonic region of a substantially constant flow speed in the rear of a first large value of the flow speed and inside a position corresponding to 15% of a chord length from the leading edge. The supersonic region is established so that a value obtained by the division of a difference between Mach numbers at front and rear ends of the supersonic region by a chord-wise length of the supersonic region is smaller than 1, and the maximum Mach number in the supersonic region is smaller than 1.4. A first large shock wave is positively generated at a position where the flow speed assumes a first maximum value, whereby a second shock wave generated in the supersonic region of the substantially constant flow speed in the rear of such a position can be weakened. Thus, boundary layer separation due to the second shock wave can be suppressed, to thereby remarkably reduce the pressure loss of a following flow on the blade.

20 Claims, 9 Drawing Sheets

FIG.6A
EMBODIMENT

FIG.6B
COMPARATIVE EXAMPLE

HIGH-TURNING AND HIGH-TRANSONIC BLADE

BACKGROUND OF THE INVENTION

1. Field of the Invention

The present invention relates to a high-turning and high-transonic blade for use in a blade cascade for an axial-flow compressor in which a large number of blades, e.g., ten or more, each having an intrados adapted to generate a positive pressure and an extrados adapted to generate a negative pressure, disposed in an annular fluid passage.

2. Description of Background Art

Japanese Patent Application Laid-open No. 7-83196 discloses a blade for an axial-flow compressor in which the distribution of curvature of an extrados of the blade is established so that the curvature is decreased from a leading edge down to a minimum value, increased therefrom up to a maximum value, and then decreased toward a trailing edge, whereby the generation of a shock wave at the leading edge is avoided to provide a reduction in pressure loss.

Japanese Patent Application Laid-open No. 9-256998 discloses a blade for a compressor in which the shape of an intrados and the shape of an extrados of a leading edge of the blade are asymmetric with respect to a mean camber line, whereby a sudden change in flow speed at the leading edge is prevented to provide an increase in compression efficiency.

U.S. Pat. No. 4,655,412 describes a wing for an airplane in which an extrados of the wing is divided into three regions of different curvatures to provide an enhancement in lift characteristic of the blade of the air plane so that the curvature is decreased steeply from a large value at a leading edge to a first minimum value in a first region extending to a position smaller than 10% of a chord length in the vicinity of the leading edge, and the curvature is varied from the first minimum value via a first maximum value to a second minimum value at a position smaller than 40% of the chord length in a following second region.

In the blade of the axial-flow compressor described in Japanese Patent Application Laid-open No. 7-83196, the distribution of curvature of the extrados at the leading edge is similar to that according to the present invention. However, this blade is of a type having an extremely small turning angle and is different in a basic shape and function from a blade of a high-turning type to which the present invention is applied.

In the blade of the axial-flow compressor described in Japanese Patent Application Laid-open No. 9-256998, the distribution of curvature of the extrados at the leading edge is similar to that according to the present invention. However, as a front portion or another portion of the distribution of curvature is subsonic, the operating condition and function of this blade is different from the blade to which the present invention is applied and in which the entire curvature distribution is supersonic.

In the wing described in U.S. Pat. No. 4,655,412, the distribution of curvature of the extrados at the leading edge is similar to that according to the present invention. However, as this blade is used in an airplane, even if this blade is used in a blade cascade for an axial-flow compressor to which the present invention is applied, a desired performance cannot be exhibited.

SUMMARY OF THE INVENTION

To achieve the above object, according to a first feature of the present invention, there is provided a high-turning and high-transonic blade for use in a blade cascade of an axial-flow compressor including a large number of blades, each of the blades having an intrados adapted to generate a positive pressure and an extrados adapted to generate a negative pressure, disposed in an annular fluid passage, wherein a distribution of flow speed on the extrados of the blade has a supersonic region of a substantially constant flow speed in the rear of a first large value of the flow speed behind a leading edge and inside a position corresponding to 15% of a chord-wise length from the leading edge.

To achieve the above object, according to a first feature of the present invention, there is provided a high-turning and high-transonic blade for use in a blade cascade of an axial-flow compressor including a large number of blades, each having an intrados adapted to generate a positive pressure and an extrados adapted to generate a negative pressure, disposed in an annular fluid passage, wherein a distribution of flow speed on the extrados of the blade has a supersonic region of a substantially constant flow speed in the rear of a first large value of the flow speed and inside a position corresponding to 15% of a chord length from a leading edge.

With the above arrangement, the distribution of flow speed on the extrados of the high-turning and high-transonic blade for use in the blade cascade of the axial-flow compressor has the supersonic region of the substantially constant flow speed inside the position corresponding to 15% of the chord length in the rear of the first large value of the flow speed. Therefore, a first large shock wave is positively generated at a position where the flow speed assumes the first large value, whereby an aerodynamic load in the vicinity of the leading edge can be increased, and a second shock wave generated in the supersonic region of the substantially constant flow speed which is in the rear of the first large value can be weakened. As a result, the boundary layer separation due to the second shock wave can be suppressed, to thereby remarkably reduce the pressure loss of a following flow on the blade. Thus, it is possible to countervail a slight increase in pressure loss of a main flow due to the first strong shock wave, to thereby reduce the total pressure loss.

According to a second feature of the present invention, in addition to the arrangement of the first feature, the supersonic region is established so that a value obtained by the division of a difference between Mach numbers at front and rear ends of the supersonic region by the chord-wise length of the supersonic region is smaller than 1, and the maximum Mach number in the supersonic region is smaller than 1.4.

According to a third feature of the present invention, there is provided a high-turning and high-transonic blade for use in a blade cascade of an axial-flow compressor including a large number blades, each having an intrados adapted to generate a positive pressure and an extrados adapted to generate a negative pressure, disposed in an annular fluid passage, wherein a first small value of curvature of the extrados is set to be sufficiently small at a leading edge of the blade, and a variation in curvature behind the leading edge is set to be small, whereby a first strong shock wave is induced at the leading edge to generate a pressure loss in a main flow, and a second weak shock wave is induced in the rear of the first shock wave to reduce a pressure loss, whereby total pressure loss due to the first and second shock waves is reduced. Such a reduction in pressure loss is in comparison to pressure loss of a conventional blade which induces a first weak shock wave at the leading edge and a second strong shock wave in the rear of the first shock wave.

With the above arrangement, the first small value of curvature of the extrados is set to be sufficiently small at the leading edge of the blade, and the variation in curvature behind the leading edge is set to be small. Therefore, the first strong shock wave is induced at the leading edge to generate the pressure loss in the main flow, and the second weak shock wave induced behind the first shock wave is weakened to suppress the boundary layer separation, thereby reducing the pressure loss in the following flow on the blade. Therefore, the total pressure loss can be reduced by the reduction in pressure loss of the following flow on the blade, the reduction far outweighing the offset of the pressure loss of the main flow.

With the above arrangement, the first large value of curvature of the extrados is set to be sufficiently small at the leading edge of the blade, and the variation in curvature in the rear of the minimum value is set to be small. Therefore, the first strong shock wave is induced at the leading edge to generate the pressure loss in the main flow, and the second weak shock wave induced in the rear of the first shock wave is weakened to suppress the boundary layer separation, thereby reducing the pressure loss in the following flow on the blade. Therefore, the total pressure loss can be reduced by the reduction in pressure loss of the following flow on the blade, the reduction far outweighing the offset of the pressure loss of the main flow.

According to a fourth feature of the present invention, in addition to any of the arrangements of the first to third features, the curvature has a first small value inside a position corresponding to 5% of the chord length, the first small value being smaller than 0.6.

With the above arrangement, the position of the first small value of the curvature of the extrados at the leading edge of the blade is within 5% of the chord length, the first small value being smaller than 0.6. Therefore, an effect of reducing the pressure loss can be exhibited most effectively.

According to a fifth feature of the present invention, in addition to any of the arrangements of the first to third features, a turning angle of the blade is set to be equal to or larger than 40°.

With the above arrangement, an effect of reducing the pressure loss can be exhibited most effectively by setting the turning angle of the blade to be equal to or larger than 40°.

According to a sixth feature of the present invention, in addition to any of the arrangements of the first to third features, the Mach number of the main flow is equal to or larger than 0.825 and smaller than 1.0.

With the above arrangement, an effect of reducing the pressure loss can be exhibited most effectively by setting the Mach number of the main flow to be equal to or larger than 0.825 and smaller than 1.0.

The above and other objects, features and advantages of the invention will become apparent from the following description of the preferred embodiment taken in conjunction with the accompanying drawings.

DESCRIPTION OF THE PRESENT EMBODIMENT

Figure 1:
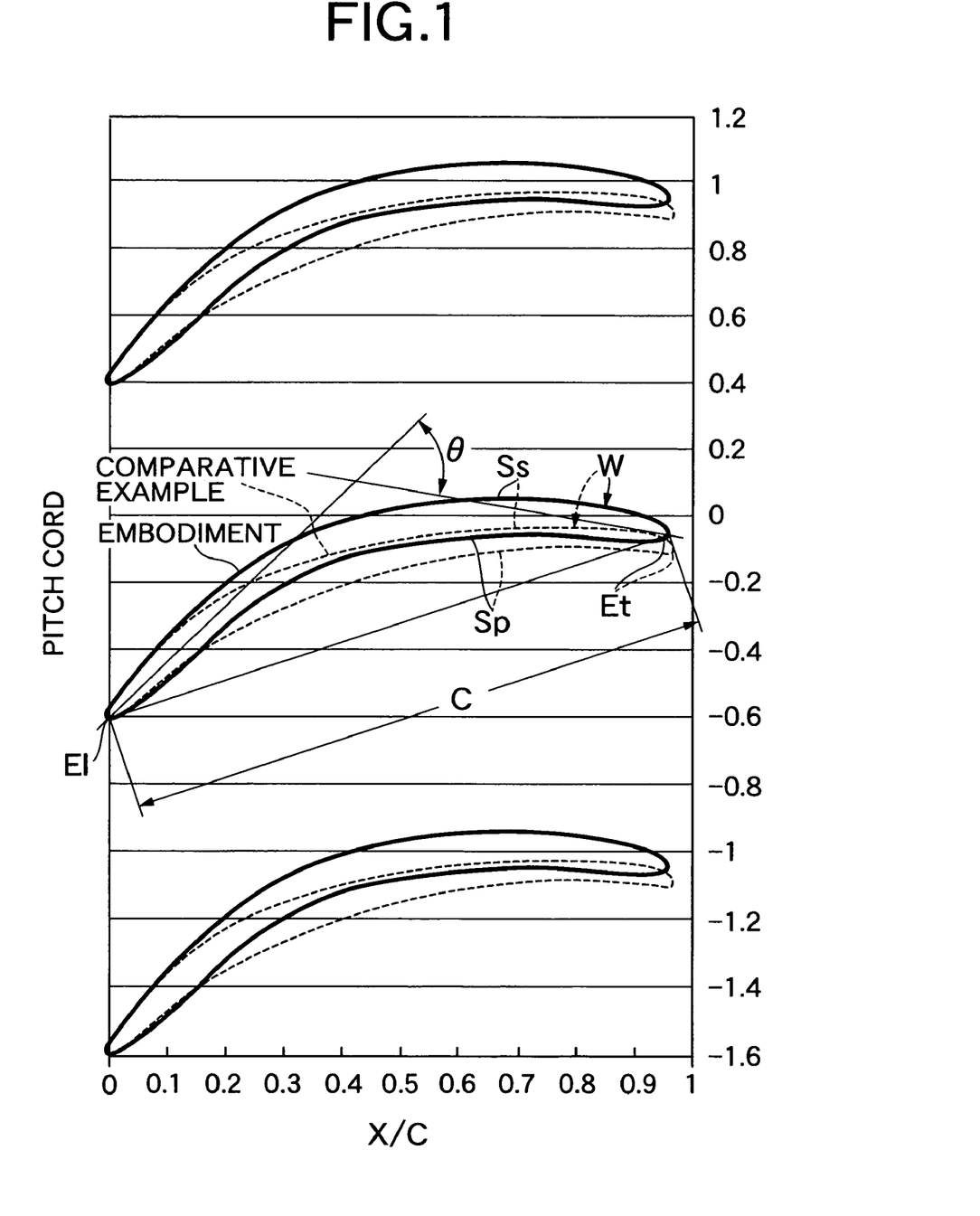
FIG. 1 is a diagram showing blade cascades in an embodiment of the present invention and in a comparative example.

The present invention relates to a high-turning and high-transonic blade for use in a blade cascade for an axial-flow compressor. In FIG. 1 showing blade cascades, a solid line indicates a blade W of the embodiment, and a broken line indicates a blade W of a comparative example. Each of the blades W has a intrados Sp (a positive pressure surface) and an extrados Ss (a negative pressure surface) each extending from a leading edge El to a trailing edge Et, and is of a high-turning type having a large camber line (a line that is equidistant at all points between the intrados and the extrados of the blade), and a turning angle θ is greater than or equal to 40°. In the embodiment, a pitch of the blade cascade is defined as 50% of a chord length C (a linear distance between the leading edge El and the trailing edge Et).

Figure 2:
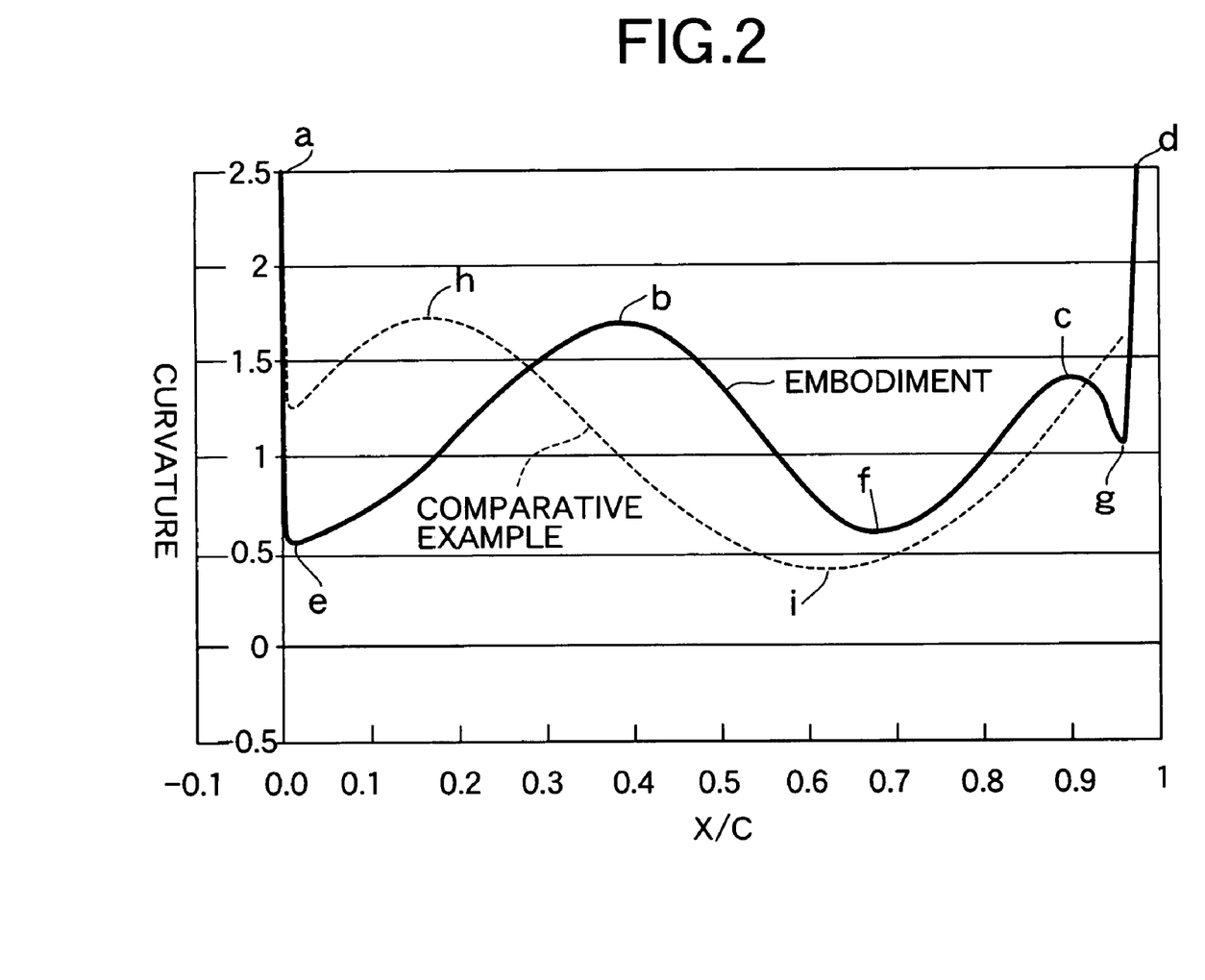
FIG. 2 is a graph showing distributions of curvatures of extradoses of blades of the embodiment and the comparative example.

FIG. 2 shows a distribution of curvature of the extrados Ss (negative pressure surface) for each of the blades W. The distribution of curvature of the blade W of the embodiment shown by a solid line has a first maximum value a immediately behind the leading edge E1 (a 0% position), a first large value b in the vicinity of a 40% position, a second large value c in the vicinity of a 90% position, and a second maximum value d immediately in front of the trailing edge Et (a 100% position). The distribution of curvature of this blade W also has a first small value e in immediately behind the first maximum value a, a second small value f in the vicinity of a 70% position, and a third small value g immediately in front of the second maximum value d. As to first small value e is immediately behind the first maximum value a, its curvature is as extremely small as 0.6. Then, the curvature is gently increased from the first small value e toward the first large value b.

FIG. 2 shows a distribution of curvature of the extrados Ss (negative pressure surface) of each of the blades W. The distribution of curvature in the blade W of the embodiment shown by a solid line has a first maximum value a immediately in the rear of the leading edge E1 (a 0% position), a first large value b in the vicinity of a 40% position, a second large value c in the vicinity of a 90% position, and a second maximum value d immediately in front of the trailing edge Et (a 100% position). This blade W also has a first small value e in immediately in the rear of the first maximum value a, a second small value f in the vicinity of a 70% position, and a third small value g immediately in front of the second maximum value d. As the first small value e is immediately in the rear of the first maximum value a, its curvature is as extremely small as 0.6. Then, the curvature is gently increased from the first small value e toward the first large value b.

The term "curvature" used herein indicates a curvatures, a non-dimensional value, represented by the chord length C. Namely, the curvature is an inverse number of a radius of curvature, but the radius of curvature is a non-dimensional value represented by the chord length C. Therefore, if an actual radius of curvature is equal to the chord length C, the non-dimensional radius of curvature is 1.0, and the curvature is 1.0. If the actual radius of curvature is two times the chord length C, the non-dimensional radius of curvature is 2.0, and the curvature is 0.5. If the actual radius of curvature is one half of the chord length C, the non-dimensional radius of curvature is 0.5, and the curvature is 2.0.

The term "curvature" used herein indicates a curvature non-dimensioned by the chord length C. Namely, the curvature is an inverse number of a radius of curvature, but the radius of curvature is a value non-dimensioned by the chord length C. Therefore, if an actual radius of curvature is equal to the chord length C, the non-dimensioned radius of curvature is 1.0, and the curvature is 1.0. If the actual radius of curvature is two times the chord length C, the non-dimensioned radius of curvature is 2.0, and the curvature is 0.5. If the actual radius of curvature is one half of the chord length C, the non-dimensioned radius of curvature is 0.5, and the curvature is 2.0.

The feature of the blade W of the embodiment lies in the distribution of curvature of the extrados Ss in the vicinity of the leading edge E1, wherein the blade W has the first small value e immediately in the rear of the first maximum value a existing immediately in the rear of the leading edge E1, and the curvature is gently increased from the first small value e. The first small value e is generated in front of the 5% position and is smaller than 0.6. A significant feature is provided in a distribution of pressure on the extrados Ss by virtue of the distribution of curvature of the extrados Ss in the vicinity of the leading edge E1 of the blade W of the embodiment.

Figure 3:
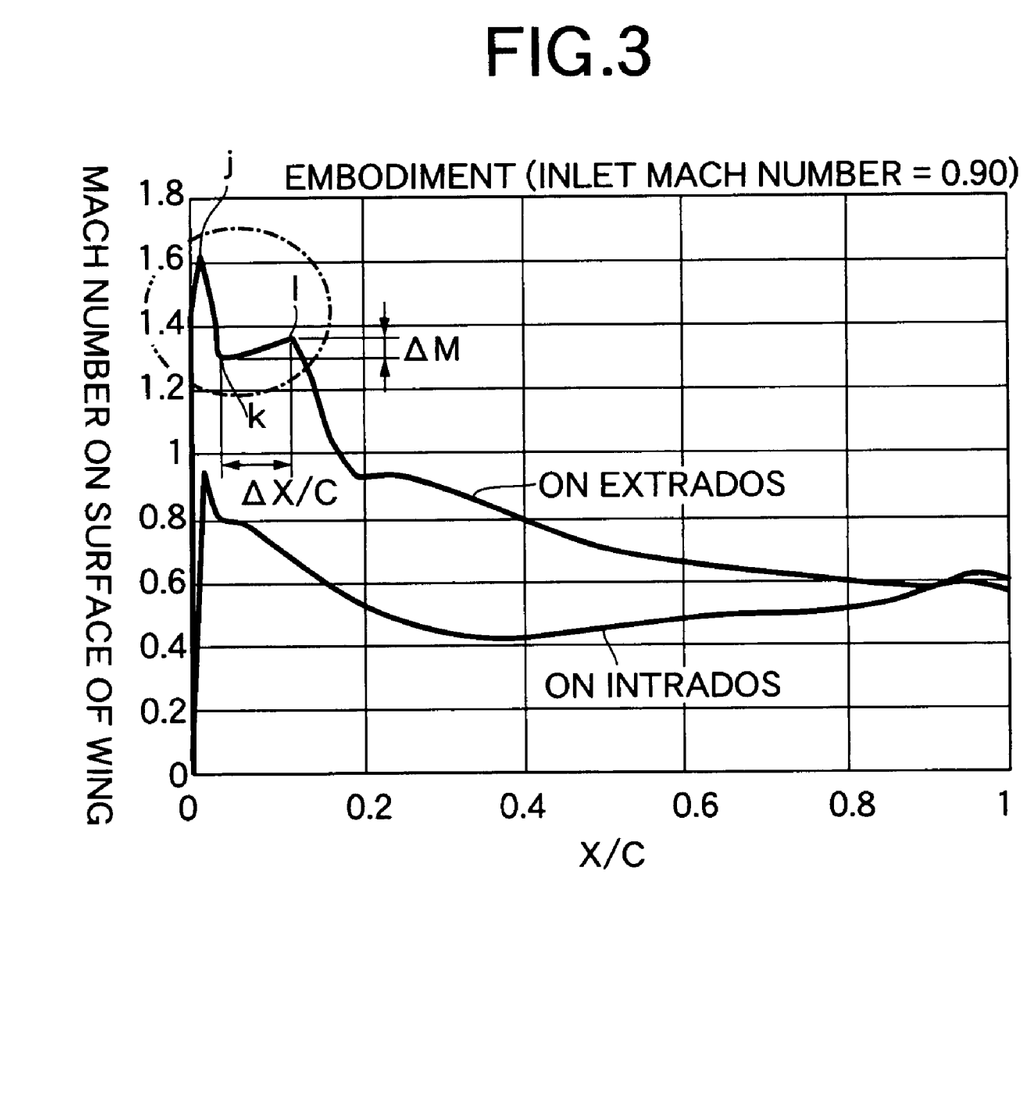
FIG. 3 is a graph showing distributions of flow speeds on the extrados and an intrados of the blade of the embodiment at an inlet Mach number equal to 0.90.

As shown in a portion of FIG. 3 surrounded by a broken line circle, in a distribution of flow speed on the extrados Ss in the vicinity of the leading edge E1 of the blade W of the embodiment, the Mach number has a first large value i equal to 1.60 generated immediately in the rear of the leading edge E1, and is decreased steeply from 1.60 to a first small value k equal to 1.30, increased gently therefrom to a second large value l equal to 1.35, and then decreased again steeply from 1.35. The first small value k is generated in a position corresponding to 3.9% of the chord length C, and the second large value l is generated in a position corresponding to 12.5% of the chord length C. A Mach number difference $\Delta M$ between the first small value k and the second large value l is represented by $\Delta M=1.35-1.30=0.05$. A chord-wise length $\Delta X/C$ between the first small value k and the second large value l is represented by $\Delta X/C=0.125-0.039=0.086$, and hence a gradient between the first small value k and the second large value l is represented by $\Delta M \div \Delta X/C=0.58$.

Figure 4:
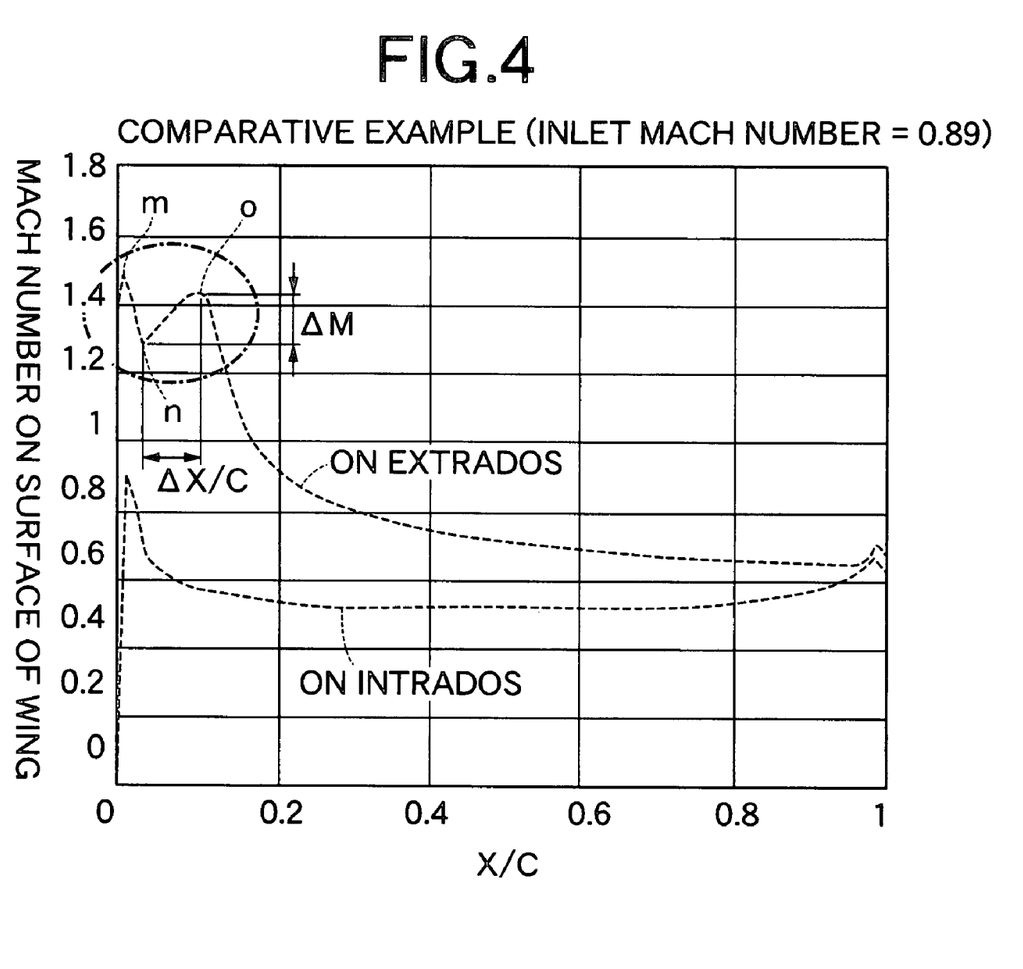
FIG. 4 is a graph showing distributions of flow speeds on an extrados and an intrados of the blade of the comparative example at an inlet Mach number equal to 0.89.

On the other hand, in FIG. 4 showing a distribution of flow speed on the extrados Ss in the vicinity of the leading edge E1 of the blade W of the comparative example, the Mach number has a first large value m equal to 1.47 generated immediately in the rear of the leading edge E1, and is decreased steeply from 1.47 to a first small value n equal to 1.30, increased steeply therefrom to a second large value o equal to 1.44, and then decreased steeply again.

Figure 5A:
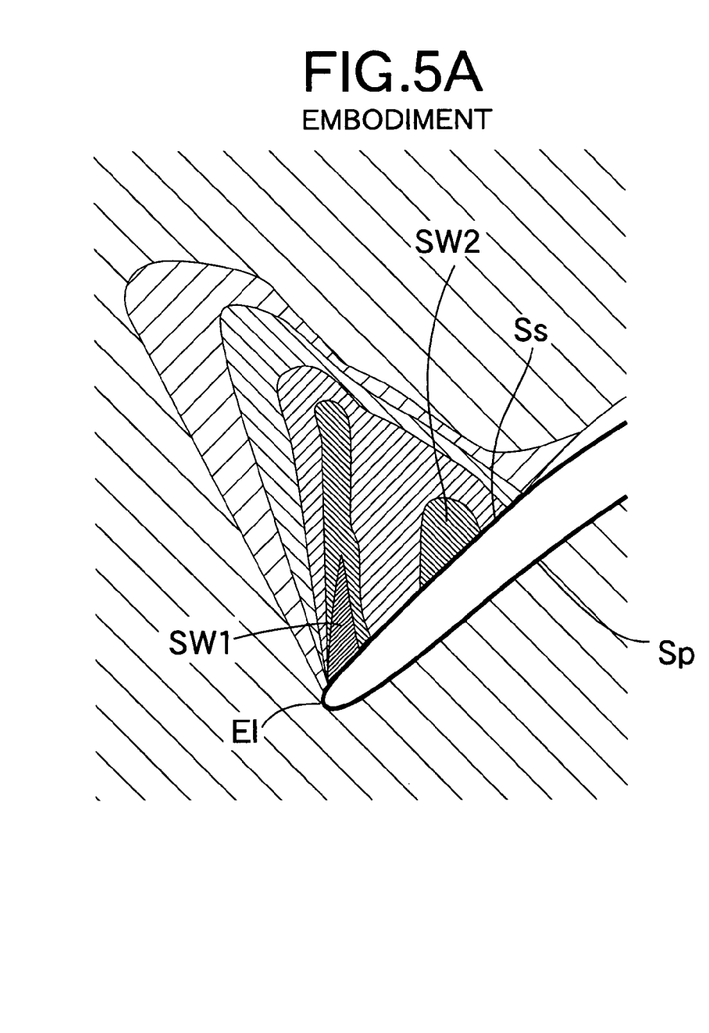
FIGS. 5A and 5B are diagrams showing distributions of flow speeds at leading edges of the blades of the embodiment and the comparative example.
Figure 5B:
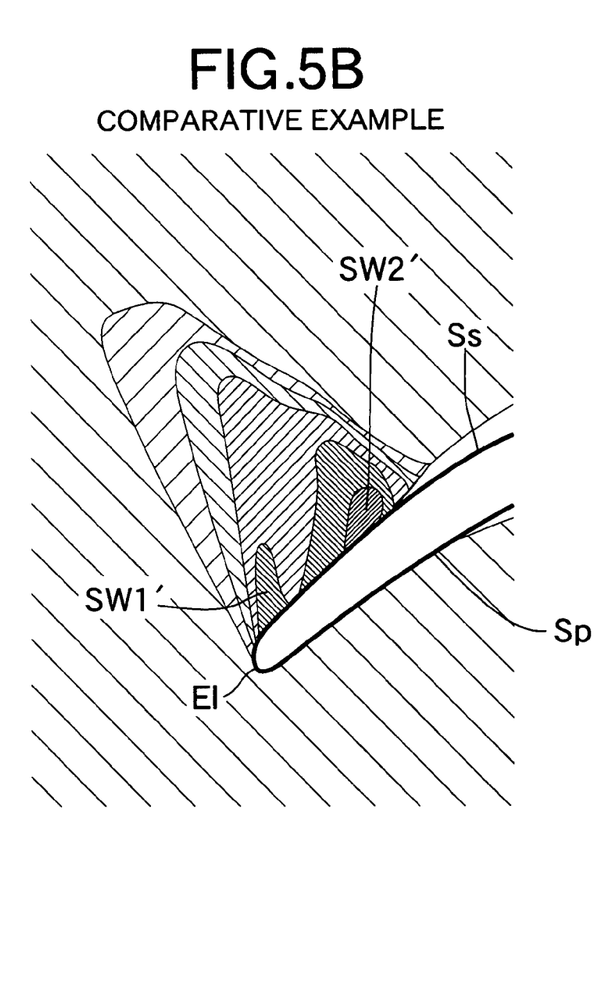
Figure 6A:
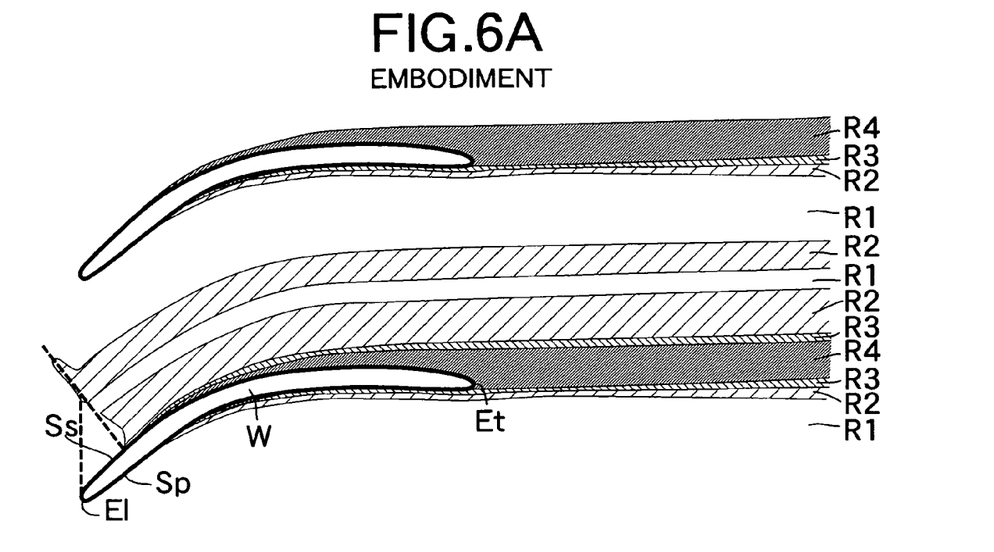
FIGS. 6A and 6B are diagrams showing distributions of loss coefficients of the blades of the embodiment and the comparative example.
Figure 6B:
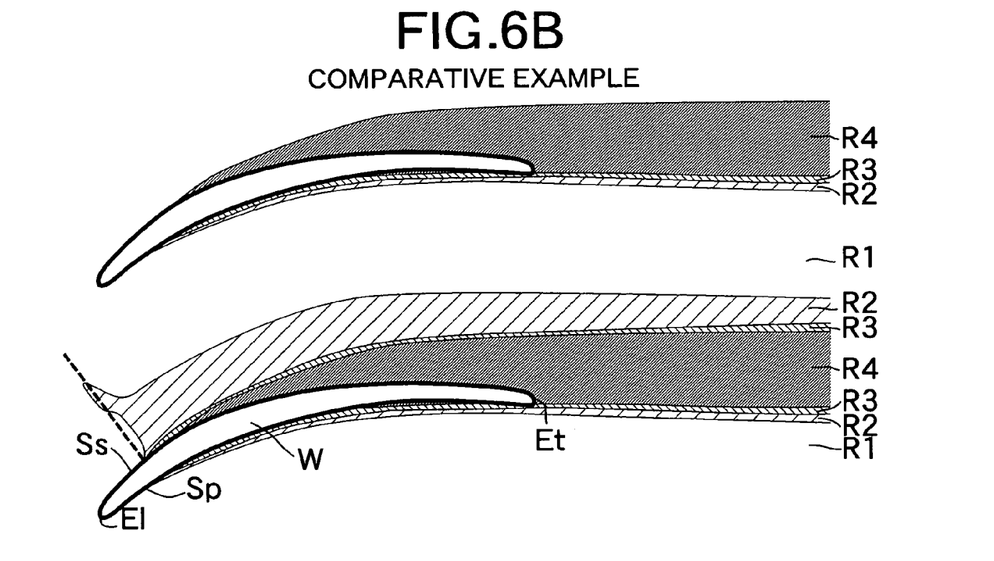

FIGS. 5A and 5B are diagrams which show distributions of flow speeds at the leading edges E1 of the blades W of the embodiment and the comparative example, in which a more densely hatched region indicates a higher flow speed and a stronger shock wave. FIGS. 6A and 6B are diagrams which show distributions of loss coefficients of the blades W of the embodiment and the comparative example, and in which a more densely hatched region indicates a larger loss coefficient, namely, in the order of R4>R3>R2>R1.

According to the distribution of flow speed on the extrados Ss in the vicinity of the leading edge E1 of the blade W of the embodiment shown in FIG. 3, a first shock wave SW1 is generated immediately in the rear of the leading edge E1 and a second shock wave SW2 is generated in the rear of the first shock wave SW1 in correspondence to the first and second large values i and l of the flow speed, as shown in FIG. 5A. The first shock wave SW1 is far stronger than the second shock wave SW2.

As a result, as shown in FIG. 6A, Region R2 having a slightly high loss coefficient in the rear of the first and second shock waves SW1 and SW2 is enlarged, but Region R4 having a highest loss coefficient in the rear of the blade W is decreased remarkably, whereby the total loss coefficient can be decreased.

On the other hand, according to the distribution of flow speed on the extrados Ss in the vicinity of the leading edge E1 of the blade W of the comparative example shown in FIG. 4, a first shock wave SW1' is generated immediately in the rear of the leading edge E1 and a second shock wave SW2' is generated in the rear of the first shock wave SW1' in correspondence to the first and second large values m and o of the flow speed, as shown in FIG. 5B. In this case, however, the second shock wave SW2' is stronger than the first shock wave SW1'. Therefore, a large boundary layer separation is generated in the rear of the second shock wave SW2'.

As a result, as shown in FIG. 6A, Region R2 having a slightly high loss coefficient in the rear of the first and second shock waves SW1' and SW2' is decreased, but Region R4 having a highest loss coefficient in the rear of the blade W is increased remarkably by the boundary layer separation, whereby the total loss coefficient is increased.

Figure 9:
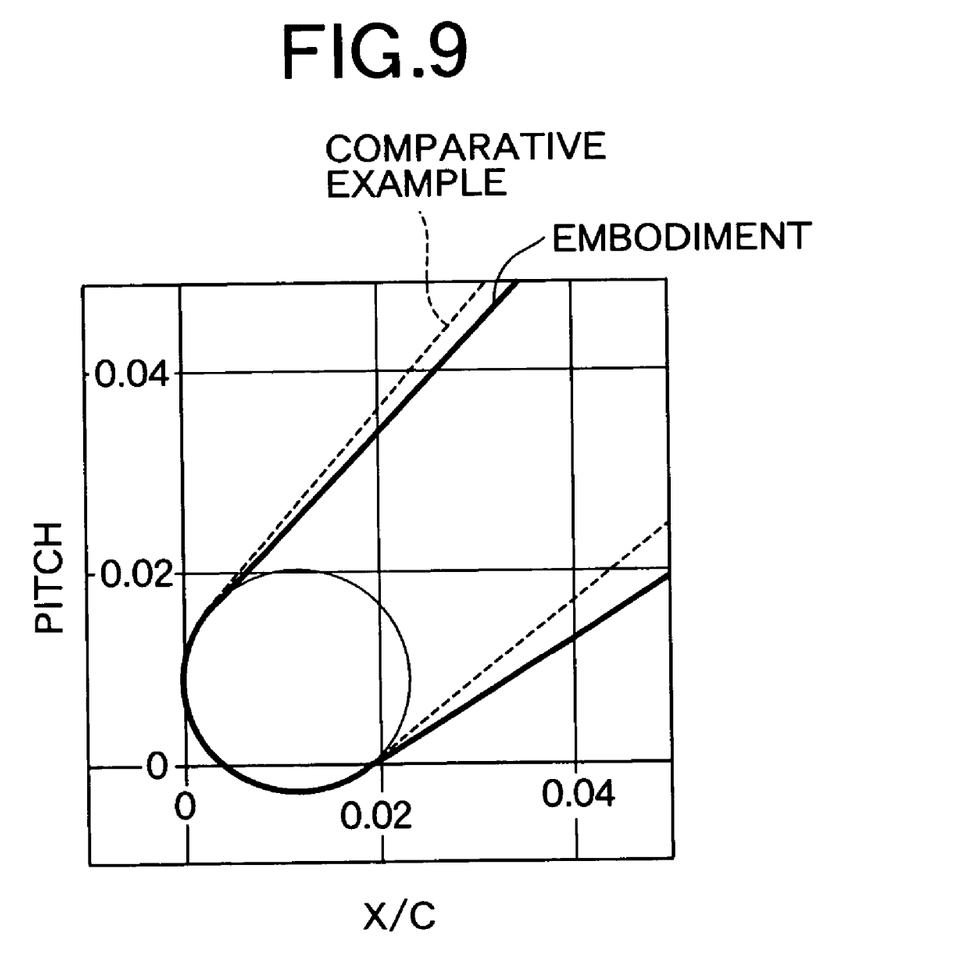
FIG. 9 is a diagram showing shapes of the leading edges of the blades of the embodiment and the comparative example.

FIG. 9 shows the shape of a portion in the vicinity of the leading edge E1 of each of the blades W of the embodiment and the comparative example.

Figure 7:
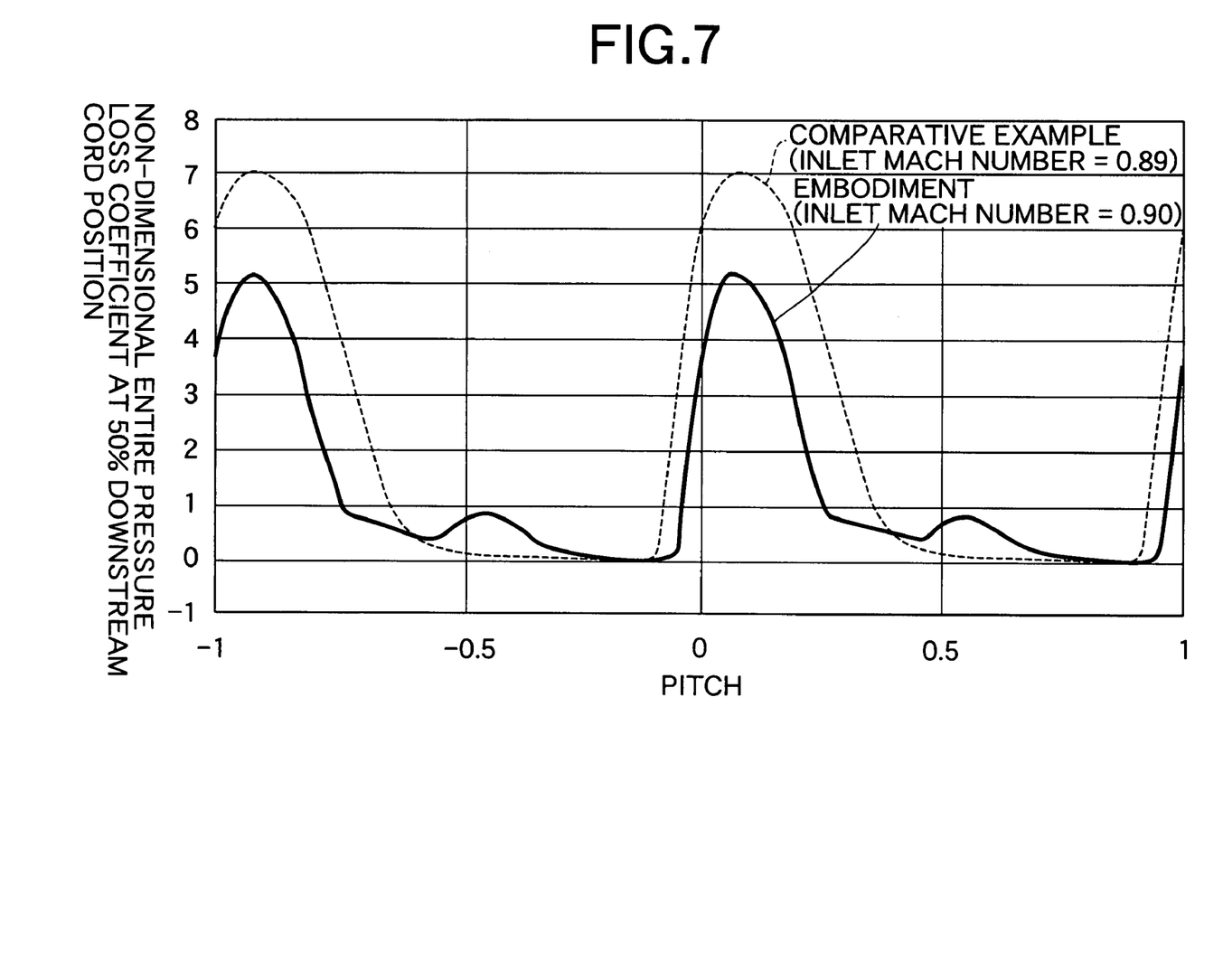
FIG. 7 is a graph showing distributions of loss coefficients in the pitch-wise direction of blade cascades of the blades of the embodiment and the comparative example.

FIG. 7 is a graph showing distributions of loss coefficients in the pitch-wise direction of the blade cascades at a location corresponding to 50% of the chord length C. It can be seen from FIG. 7 that the loss coefficient of the blade W of the embodiment shown by a solid line is slightly increased at a main flow section between the adjacent blades of the blade cascade, but decreased remarkably at a following flow section of the blade W, and hence the total loss coefficient is decreased, as compared with that of the blade W of the comparative example shown by a broken line.

In the blade W of the embodiment, as described above, the first small value e of the curvature is provided immediately in the rear of the leading edge E1 to increase the flow speed; the first strong shock wave SW1 is positively generated thereat to increase an aerodynamic load in the vicinity of the leading edge E1; the first small value e in the rear of the first maximum value a of the curvature is decreased sufficiently; and the curvature is increased gently therefrom to the rear. Therefore, the second shock wave SW2 generated at a front portion of the blade (at a position corresponding to approximately 15% of the chord length C), which causes the large boundary layer separation in the rear of the first small value e, can be weakened. As a result, the boundary layer separation can be moderated, and the total pressure loss due to the first and second shock waves SW1 and SW2 can be decreased.

On the other hand, in the blade W of the comparative example, the loss coefficient of a main flow is little increased because the first shock wave SW1' is small, but the boundary layer is separated because the second shock wave SW2' is large, whereby the loss coefficient of a following flow on the blade W is increased remarkably, resulting in an increase in total loss coefficient.

Figure 8:
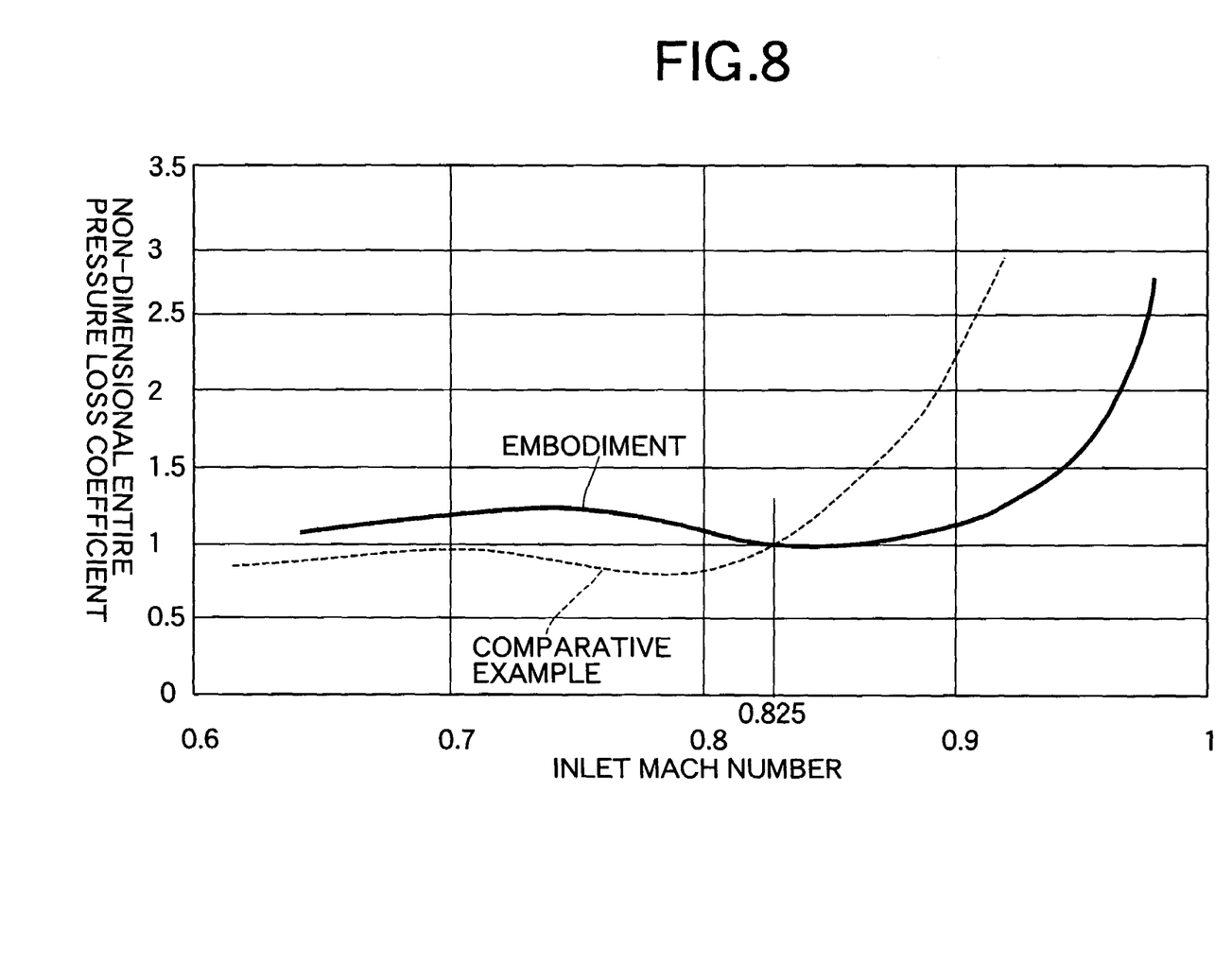
FIG. 8 is a graph showing variations in loss coefficients of the blades of the embodiment and the comparative example with respect to the Mach number.

FIG. 8 is a graph showing a variation in loss coefficient relative to the Mach number in each of the embodiment and the comparative example. FIG. 8 indicates that, in a region of the Mach number smaller than 0.825, the loss coefficient in the blade W of the embodiment is slightly larger than the loss coefficient in the blade W of the comparative example, but in a region of the Mach number equal to or larger than 0.825, the loss coefficient in the blade W of the embodiment is remarkably smaller than the loss coefficient in the blade W of the comparative example. Therefore, it is confirmed that the embodiment provides a great effect of decreasing the loss coefficient.

As can be seen from the above description, it is requisite that the distribution of curvature in the blade W according to the present invention has a supersonic region of a substantially constant flow speed in the rear of the first small value i of the flow speed on the extrados Ss, and it is also requisite that the rear end of the supersonic region exists inside a position corresponding to 15% of the chord length C (a position corresponding to 12.5% in the embodiment). To exhibit the effect of the blade W according to the present invention to the maximum, the first small value e of the curvature preferably exists in front of a position corresponding to 5% of the chord length C (a position corresponding to 3.9% in the embodiment), and is preferably smaller than 0.6. Also, the value of $\Delta M \div \Delta X/C$ which is a gradient of the supersonic region is preferably smaller than 1 (0.58 in the embodiment), and the maximum Mach number in the supersonic region is smaller than 1.4 (1.35 in the embodiment). Further, the inlet speed of the main flow to the blade cascade is preferably a high transonic speed equal to or larger than 0.825 and smaller than 1.0 in the terms of Mach number.

Although the embodiment of the present invention has been described in detail, it will be understood that the present invention is not limited to the above-described embodiment, and various modifications in design may be made without departing from the subject matter of the invention defined in the claims.

What is claimed is:

1. A high-turning and high-transonic blade for use in a blade cascade of an axial-flow compressor including a large number of blades disposed in an annular fluid passage each said blade having an intrados adapted to generate a positive pressure and an extrados adapted to generate a negative pressure,
   wherein a distribution of flow speed on the extrados has a supersonic region of a substantially constant flow speed after a region that is decreased steeply from a first large value of the flow speed, said supersonic region of a substantially constant flow speed being inside a position corresponding to 15% of a chord length from a leading edge of the blade, and said supersonic region of a substantially constant flow speed being followed by a steeply decreased region.

2. A high-turning and high-transonic blade according to claim 1, wherein a turning angle of the blade is set to be at least 40°.

3. A high-turning and high-transonic blade according to claim 1, wherein a Mach number of a main flow to the blade cascade is at least 0.825 and less than 1.0.

4. A high-turning and high-transonic blade according to claim 1, wherein the flow speed behind the leading edge has a first large value.

5. A high-turning and high-transonic blade according to claim 1, wherein the supersonic region is established so tat a value obtained byte division of a difference between Mach numbers at front and rear ends of the supersonic region by the chord length of the supersonic region is smaller than 1, and a maximum Mach number in the supersonic region is smaller than 1.4.

6. A high-turning and high-transonic blade according to claim 5, wherein a turning angle of the blade is set to be at least 40°.

7. A high-turning and high-transonic blade according to claim 5, wherein a Mach number of a main flow to the blade cascade is at least 0.825 and less than 1.0.

8. A high-turning and high-transonic blade for use in a blade cascade of an axial-flow compressor including a large number of blades disposed in an annular fluid passage, each said blade having an intrados adapted to generate a positive pressure and an extrados adapted to generate a negative pressure,
   wherein a first small value of curvature of the extrados is set to be sufficiently small at a leading edge of the blade, and a variation in curvature behind the first small value of curvature towards a trailing edge is set such that a distribution of flow speed on the extrados has a first large value just behind the leading edge, that is followed by a region which is decreased steeply from the first lane value, said region being followed by a supersonic region of a substantially constant flow speed, said supersonic region of a substantially constant flow speed followed by another steeply decreased region, said supersonic region of a substantially constant flow speed being inside a position corresponding to 15% of a chord length from the leading edge of the blade, whereby a first strong shock wave is induced at the leading edge to generate a pressure loss in a main flow, and a second weak shock wave is induced in the rear of the first shock wave to reduce a pressure loss in a following flow on the blade, whereby total pressure loss due to the first and second shock waves is reduced.

9. A high-turning and high-transonic blade according to claim 8, wherein a turning angle of the blade is set to be at least 40°.

10. A high-turning and high-transonic blade according to claim 8, wherein a Mach number of a main flow to the blade cascade is at least 0.825 and less than 1.0.

11. A high-turning and high-transonic blade according to claim 8, wherein said total pressure loss is reduced in comparison to a blade which induces a first weak shock wave at the leading edge and a second strong shock wave behind the first shock wave.

12. A high-turning and high-transonic blade for use in a blade cascade of an axial-flow compressor including a large number of blades disposed in an annular fluid passage, each said blade having an intrados adapted to generate a positive pressure and an extrados adapted to generate a negative pressure; wherein
   a curvature of the extrados varies from a leading edge to a trailing edge of the blade;

a first maximum value of curvature is located immediately behind the leading edge;
a first small value of curvature is located immediately behind the first maximum value of curvature;
a distribution of flow speed on the extrados has a supersonic region of a substantially constant flow speed;
the supersonic region includes a portion of the extrados extending from the curvature having the first small value to a position corresponding to 15% of a chord-wise length from the leading edge; and
the first small value of curvature is located inside a position corresponding to 5% of the chord-wise length, and the first small value of curvature is less than 0.6.

13. A high-turning and high-transonic blade for use in a blade cascade of an axial-flow compressor including a large number of blades disposed in an annular fluid passage, each said blade having an intrados adapted to generate a positive pressure and an extrados adapted to generate a negative pressure; wherein
a curvature of the extrados varies from a leading edge to a wailing edge of the blade;
a first maximum value of curvature is located immediately behind the leading edge;
a first small value of curvature is located immediately behind the first maximum value of curvature;
a distribution of flow speed on the extrados has a supersonic region of a substantially constant flow speed;
the supersonic region includes a portion of the extrados extending behind curvature having the first small value to a position corresponding to 15% of a chord-wise length from the leading edge;
the supersonic region is established so tat a value obtained by the division of a difference between Mach numbers at front and rear ends of the supersonic region by the chord-wise length of the supersonic region is smaller than 1, and a maximum Mach number in the supersonic region is smaller than 1.4; and
the first small value of curvature is located inside a position corresponding to 5% of the chord-wise length, and the first small value of curvature is less than 0.6.

14. A high-turning and high-transonic blade for use in a blade cascade of an axial-flow compressor including a large number of blades disposed in an annular fluid passage, each said blade having an intrados adapted to generate a positive pressure and an extrados adapted to generate a negative pressure, wherein
a first small value of curvature of the extrados is set to be sufficiently small at a leading edge of the blade, and a variation in curvature behind the first small value of curvature towards a trailing edge is set to be small, whereby a first strong shock wave is induced at the leading edge to generate a pressure loss in a main flow, and a second weak shock wave is induced behind the first shock wave to reduce a pressure loss in a following flow on the blade, whereby total pressure loss due to the first and second shock waves is reduced; and
the first small value of curvature is located inside a position corresponding to 5% of a chord-wise length from a leading edge of the blade, and the first small value of curvature is less than 0.6.

15. An axial-flow compressor, comprising:
a plural high-turning and high-transonic blades disposed in an annular fluid passage; and
each said blade having an intrados adapted to generate a positive pressure and an extrados adapted to generate a negative pressure;
wherein
a curvature of the extrados varies from a leading edge to a trailing edge of the blade;
a curvature having a first maximum value is located immediately behind the leading edge;
a curvature having a first small value is located immediately behind the first maximum value of curvature;
a curvature having a second maximum value is located immediately in front of the tailing edge; and
a portion of the extrados has a supersonic region of a substantially constant flow speed.

16. The axial-flow compressor of claim 15, wherein
the supersonic region of substantially constant flow speed on the extrados extends from the curvature having the first small value to a position corresponding to 15% of a chord-wise length from the leading edge.

17. The axial-flow compressor of claim 15, wherein the first and second maximum values of curvature are equal.

18. The axial-flow compressor of claim 15, wherein
a curvature of extrados is gently increased from the curvature having the first small value until the curvature attains a first large value at a chord-wise length of 40%.

19. The axial-flow compressor of claim 18, wherein
a curvature of extrados is gently decreased from the curvature having the first large value until the curvature attains a second small value at a chord-wise length of 70%.

20. The axial-flow compressor of claim 19, wherein
a curvature of extrados is gently increased from the curvature having the second small value until the curvature attains a second large value, and thereafter gently decreased to a curvature having a third small value, and further sharply increased to attain the second maximum value at the trailing edge.

* * * * *